(12) United States Patent
Kim

(10) Patent No.: US 6,996,465 B2
(45) Date of Patent: Feb. 7, 2006

(54) SHIFTING SYSTEM FOR VEHICLE

(75) Inventor: Seung Hoon Kim, Gimpo (KR)

(73) Assignee: Hyundai Motor Company, Seoul (KR)

( * ) Notice: Subject to any disclaimer, the term of this patent is extended or adjusted under 35 U.S.C. 154(b) by 88 days.

(21) Appl. No.: 10/747,007

(22) Filed: Dec. 23, 2003

(65) Prior Publication Data
US 2004/0249541 A1 Dec. 9, 2004

(30) Foreign Application Priority Data
Jun. 5, 2003 (KR) ..................... 10-2003-0036368

(51) Int. Cl.
*G06F 19/00* (2006.01)
(52) U.S. Cl. ............................ 701/51; 701/62; 477/125
(58) Field of Classification Search ................... 701/51, 701/55, 56, 62; 477/34, 125, 126
See application file for complete search history.

(56) References Cited

U.S. PATENT DOCUMENTS

| | | | | |
|---|---|---|---|---|
| 5,409,434 A | * | 4/1995 | Furukawa et al. | 477/131 |
| 5,505,674 A | * | 4/1996 | Furukawa et al. | 477/130 |
| 6,139,468 A | * | 10/2000 | Goates et al. | 477/97 |
| 6,508,139 B2 | * | 1/2003 | Onodera | 74/335 |
| 6,589,131 B2 | * | 7/2003 | Miyata et al. | 477/34 |
| 6,835,162 B2 | * | 12/2004 | Yamauchi et al. | 477/101 |
| 6,866,611 B2 | * | 3/2005 | Tsuzuki et al. | 477/97 |
| 2002/0115527 A1 | * | 8/2002 | Miyata et al. | 477/34 |
| 2004/0010361 A1 | * | 1/2004 | Gierer et al. | 701/62 |
| 2004/0162661 A1 | * | 8/2004 | Kikuchi | 701/62 |
| 2004/0186646 A1 | * | 9/2004 | Kuwata et al. | 701/55 |

FOREIGN PATENT DOCUMENTS

JP 2002-307965 10/2002

* cited by examiner

*Primary Examiner*—Gary Chin
(74) *Attorney, Agent, or Firm*—Morgan Lewis & Bockius LLP

(57) ABSTRACT

A shifting system is provided which comprises a transmission, a driver interface, and an inhibitor switch actuating module. The transmission is configured to receive a rotational force and to realize a predetermined shifting ratio, and it has an inhibitor switch. The driver interface module generates a target shift range signal corresponding to a shift range that is selected by a driver. The inhibitor switch actuating module is connected through a real-time communication bus to the driver interface module, and it actuates the inhibitor switch based on a current inhibitor switch position and the target shift range signal input from the driver interface module.

13 Claims, 1 Drawing Sheet

US 6,996,465 B2

SHIFTING SYSTEM FOR VEHICLE

CROSS-REFERENCE TO RELATED APPLICATIONS

This application claims priority of Korean Application No. 10-2003-0036368, filed on Jun. 5, 2003, the disclosure of which is incorporated fully herein by reference.

FIELD OF THE INVENTION

The present invention relates to a shifting system for a vehicle, and more particularly, to a shifting system that is capable of performing a shifting operation through an electrical signal between a shift lever and a transmission.

BACKGROUND OF THE INVENTION

Recently, by-wire systems for vehicles have been widely developed. By-wire systems transmit electrical signals through wire to perform specific operations, instead of using mechanical systems to directly transmit mechanical driving energy. Such by-wire system includes a brake-by-wire system, a steer-by-wire-system, and the like.

Recently, shift-by-wire systems that perform gear shifting by an electrical signal have been under development. In a shift-by-wire system, various shift links for connecting a shift lever and a transmission have been substituted by a wire transmitting an electrical signal, so that more efficient use of a passenger compartment is possible and weight of a vehicle can be substantially decreased.

Prior shift-by-wire systems eliminated shift links of an automatic transmission such as a lever, an inhibitor switch, and a manual valve, and utilized an electronic solenoid to perform gear shifting. Therefore, prior shift-by-wire systems had a drawback in that the overall structure of a transmission must be changed.

Furthermore, the prior shift-by-wire system passively copes with system failure, i.e., it provides only a fail-safe function (e.g., a restriction of a position of a shift lever during a shift error). That is, prior shift-by-wire systems have few strategies for coping with a system failure.

The information disclosed in this Background of the Invention section is only for enhancement of understanding of the background of the invention, and should not be taken as an acknowledgement or any form of suggestion that this information forms the prior art that is already known to a person skilled in the art.

SUMMARY OF THE INVENTION

Embodiments of the present invention provide a shift-by-wire shifting system that has a simple structure and can effectively cope with various errors.

In a preferred embodiment of the present invention, the shifting system comprises a transmission, a driver interface, and an inhibitor switch actuating module. The transmission is configured to receive a rotational force and to realize a predetermined shifting ratio, and it has an inhibitor switch. The driver interface module generates a target shift range signal corresponding to a shift range that is selected by a driver. The inhibitor switch actuating module is connected through a real-time communication bus to the driver interface module, and it actuates the inhibitor switch based on a current inhibitor switch position and the target shift range signal input from the driver interface module.

Preferably, the inhibitor switch actuating module comprises at least one actuator for actuating the inhibitor switch. It is preferable that the actuator is a motor.

It is preferable that the driver interface module comprises: a shift range selection member configured to receive a selected shift range; a plurality of shift range sensors for detecting the selected shift range through the shift range selection member and for generating detected shift range signals representing the detected shift range; and a first fault-tolerant unit comprising at least one fail-silent unit that is configured to generate a target shift range signal based on the detected shift range signals input from the shift range sensors, and wherein the inhibitor switch actuating module comprises: a plurality of inhibitor switch position sensors detecting a current position of the inhibitor switch and generating corresponding inhibitor switch position signals; a second fault-tolerant unit comprising at least one fail-silent unit that is configured to generate an inhibitor switch actuating signal based on the target shift range signal input from the first fault-tolerant unit and the inhibitor switch position signals input from the inhibitor switch position sensors; and at least one actuator actuating the inhibitor switch according to the inhibitor switch actuating signal input from the second fault-tolerant unit.

It is further preferable that the first fault-tolerant unit comprises a first main fail-silent unit and a first redundant fail-silent unit, and the second fault-tolerant unit comprises a second main fail-silent unit and a second redundant fail-silent unit, and wherein the first main fail-silent unit, the first redundant fail-silent unit, the second main fail-silent unit, and the second redundant fail-silent unit are connected with each other through at least one real-time communication bus.

It is also preferable that each of the first main fail-silent unit and the first redundant fail-silent unit comprises: a plurality of microcontrollers generating a target shift range signal based on the plurality of detected shift range signals input from the plurality of shift range sensors and outputting the same; and a communication controller controlling a transmission of the target shift range signal from the microcontrollers to the second fault-tolerant unit.

Preferably, each of the first main fail-silent unit and the first redundant fail-silent unit is configured to not output its signal if the target shift range signals generated by the plurality of microcontrollers are different from each other.

It is preferable that each of the second main fail-silent unit and the second redundant fail-silent unit comprises: a communication controller controlling a signal transmission from the first fault tolerant unit; and a plurality of microcontrollers generating an inhibitor switch actuating signal based on the inhibitor switch position signals input from the plurality of the inhibitor switch position sensors and the target shift range signal input from the first fault-tolerant unit.

Preferably, each of the second main fail-silent unit and the second redundant fail-silent unit is configured to not output the inhibitor switch actuating signal if the inhibitor switch actuating signals generated by the plurality of microcontrollers are different from each other.

It is preferable that the first fault-tolerant unit is configured such that the first redundant fail-silent unit generates the target shift range signal and outputs the same if the first main fail-silent unit does not output the target shift range signal.

It is also preferable that the second fault-tolerant unit is configured such that the second redundant fail-silent unit generates the inhibitor switch actuating signal and outputs the same if the second main fail-silent unit does not output the inhibitor switch actuating signal.

Preferably, a number of the shift range sensors is three, and each of the first main fail-silent unit and the first redundant fail-silent unit generates the target shift range signal when a majority of the three signals input from the shift range sensors are the same.

It is preferable that a number of the inhibitor switch position sensors is three, and each of the second main fail-silent unit and the second redundant fail-silent unit generates the inhibitor switch actuating signal when a majority of the three signals input from the inhibitor switch position sensors are the same.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Figure 1:
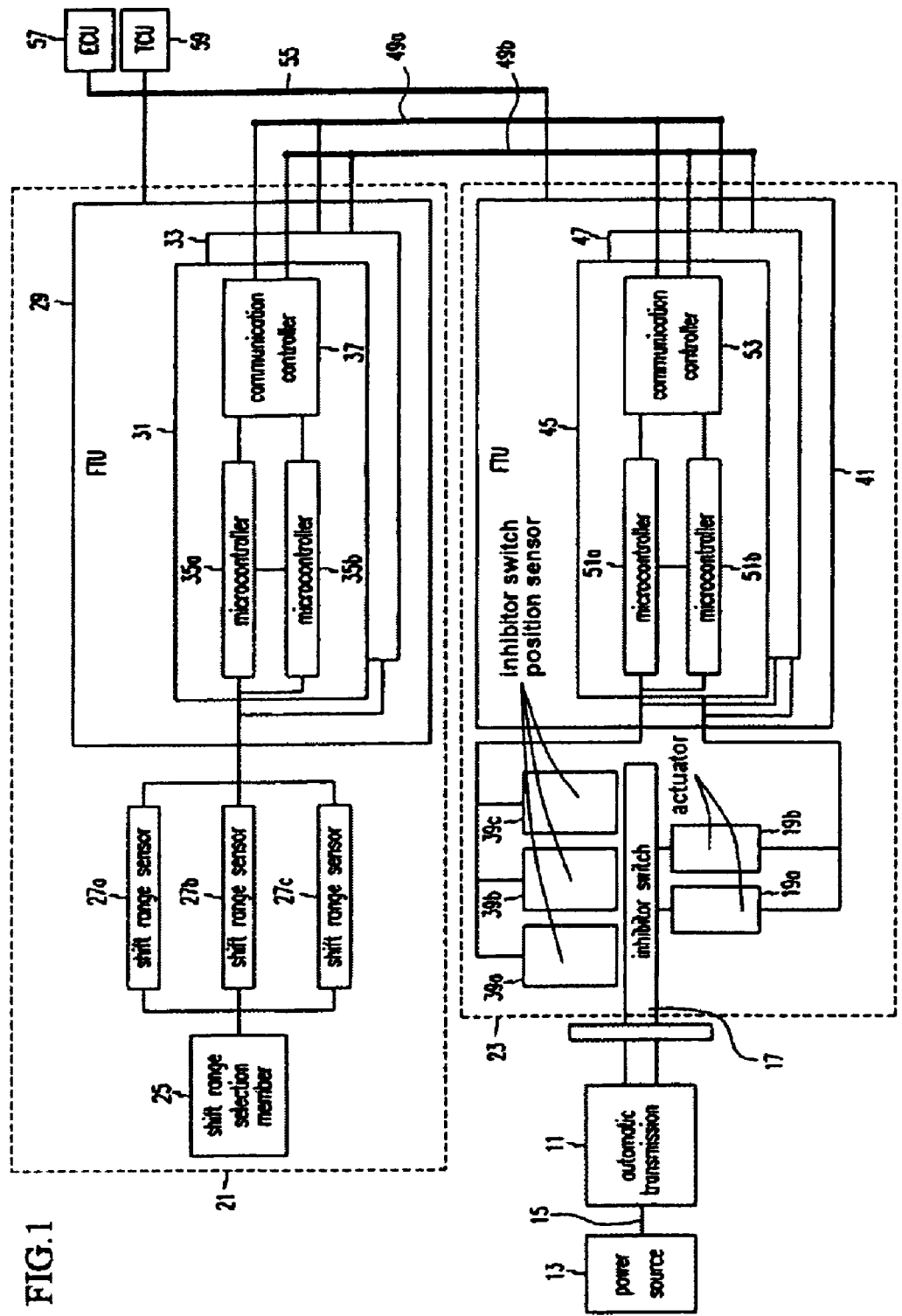
FIG. 1 is a diagram schematically showing a shifting system according to a preferred embodiment of the present invention.

Hereinafter, a preferred embodiment of the present invention will be described in detail with reference to the accompanying drawings.

As shown in FIG. 1, a shifting system according to a preferred embodiment of the present invention includes an automatic transmission 11. The automatic transmission 11 is connected through a connecting shaft 15 to a power source 13 that generates power for driving a vehicle, and it is configured to change a rotational speed input by the connecting shaft 15 to a target output speed. The power source 13 can be any device that can be applied to a vehicle. For example, the power source 13 can be an internal combustion engine or an electric motor.

The automatic transmission 11 can be a conventional automatic transmission, and it includes an inhibitor switch 17 that operates responding to a shift range (for example, a parking range P, a reverse range R, a neutral range N, a forward driving range D, a third range 3, a second range 2, and a low range L) selected by a manipulation of a shift lever.

If the inhibitor switch 17 operates, a manual valve (not shown) of a hydraulic circuit of the automatic transmission 11 is actuated. Hydraulic pressure is controlled according to the operation of the manual valve so that friction elements of the automatic transmission 11 are selectively engaged to realize a desired gear.

The inhibitor switch 17 also can be a conventional inhibitor switch. In the conventional transmission, the inhibitor switch is mechanically connected to a shift lever so that it operates responding to a manipulation of the shift lever. On the other hand, the inhibitor switch 17 of the shifting system according to a preferred embodiment of the present invention is driven by actuators 19a and 19b.

The shifting system according to a preferred embodiment of the present invention comprises a driver interface module 21 and an inhibitor switch actuating module 23. The driver interface module 21 is configured to be able to receive a signal of a desired shift range that is selected by a driver, and it generates a target shift range signal corresponding to the input shift range signal.

The driver interface module 21 comprises a shift range selection member 25, at least one of shift range sensors 27a, 27b, and 27c, and a first fault-tolerant unit 29.

The shift range selection member 25 can be any device to provide a tool for the driver to select a desired shift range, such as a switch. That is, the shift range selection member 25 can be realized as any arbitrary driver interface that is capable of providing a tool for selection of a desired shift range by a driver.

The shift range sensors 27a, 27b, and 27c are configured to detect the shift range selected through the shift range selection member 25 and to generate a corresponding signal (detected shift range signal).

The shifting system according to a preferred embodiment of the present invention can be fault-tolerant, because it is provided with three shift range sensors 27a, 27b and 27c. The number of the shift range sensors is not restricted to three.

The first fault-tolerant unit 29 receives the detected shift range signal from the shift range sensors 27a, 27b, and 27c, and generates a signal (target shift range signal) for operating the inhibitor switch 17 to locate at a position corresponding to the detected shift range.

The first fault-tolerant unit 29 includes a plurality of fail-silent units 31 and 33 that are respectively connected to each of the shift range sensors 27a, 27b, and 27c. In this embodiment, the first fault-tolerant unit 29 includes two fail-silent units.

As shown in the drawing, the first main fail-silent unit 31 and the first redundant fail-silent unit 33 are respectively connected to each of the three shift range sensors 27a, 27b, and 27c.

The first main fail-silent unit 31 includes two microcontrollers 35a and 35b, and one communication controller 37. Also, the first main fail-silent unit 31 includes an input interface, an output interface, a memory, and related hardware and software, and it is programmed to perform a signal processing method that will be explained hereinafter.

Each of the microcontrollers 35a and 35b is connected to the three shift range sensors 27a, 27b, and 27c, so that each of the microcontrollers 35a and 35b can receive signals from all three shift range sensors 27a, 27b, and 27c.

Furthermore, the microcontrollers 35a and 35b are connected to each other, so that each of the microcontrollers 35a and 35b can recognize a signal generated by the other. Each microcontroller 35a and 35b receives detected shift range signals from the three shift range sensors 27a, 27b, and 27c, and generates a target shift range signal based on the received three detected shift range signals.

Each of the microcontrollers 35a and 35b also determines whether the three received signals includes either two or three of the same signals, and it regards the corresponding signal as a correct signal only if the determination is affirmative. For example, if two of the received three signals are signals representing a forward driving range D and the other is a signal representing a reverse range R, the microcontrollers 35a and 35b each determine that the selected shift range is the forward driving range D and therefore generate a corresponding target shift range signal that has the forward driving range D as a target shift range. If the three received signals are identical, the microcontrollers 35a and 35b determine that a shift range represented by the received signals is selected and generates a corresponding target shift signal. However, if the shift ranges represented by the three received shift range signals are all different from each other, the microcontrollers 35a and 35b determine that there is an error and do not generate a target shift range signal.

In addition, each of the microcontrollers 35a and 35b is configured to compare its target shift range signal with the target shift range signal generated by the other. If it is determined that the two target shift range signals are identical, the target shift range signal is output to the communication controller 37. On the other hand, if it is determined that the two target shift range signals are different from each other, the microcontrollers 35a and 35b do not output the target shift range signals to the communication controller 37 (fail-silent).

As stated in the above, the first main fail-silent unit 31 generates its signal in a fail-silent way.

The first redundant fail-silent unit 33 has the same inner structure as the first main fail-silent unit 31, and it generates the target shift range signal in the same way. The first redundant fail-silent unit 33 monitors whether or not the target shift range signal is output from the first main fail-silent unit 31. If it is determined that the target shift range signal is not output from the first main fail-silent unit 31, the first redundant fail-silent unit 33 generates its target shift range signal and outputs the same (fault-tolerant).

That is, if the first main fail-silent unit 31 operates normally; the first main fail-silent unit 31 outputs its target shift range signal. On the other hand, if the first main fail-silent unit 31 does not operate normally, the first redundant fail-silent unit 33 outputs its target shift range signal. Therefore, the first fault-tolerant unit 29 can operate normally even when the first main fail-silent unit 31 is faulty (fault-tolerant).

The inhibitor switch actuating module 23 generates an inhibitor switch actuating signal, based on the target shift range signal input from the driver interface module 21 and a signal representing a current position of the inhibitor switch 17.

That is, the inhibitor switch actuating module 23 compares the current position of the inhibitor switch 17 and a target position of the inhibitor switch 17 corresponding to the target shift range signal, and it generates the inhibitor switch actuating signal for actuating the inhibitor switch 17 to locate at the target position, based on the result of the comparison.

The inhibitor switch actuating module 23 comprises inhibitor switch position sensor 39a, 39b, and 39c, a second fault-tolerant unit 41, and at least one of actuators 19a and 19b.

In this embodiment, the inhibitor switch actuating module 23 includes two actuators 19a and 19b for actuating the inhibitor switch 17, in order to cope with a case in which one of the actuators is faulty. It is also possible that the inhibitor switch actuating module 23 includes more than two actuators. For example, the actuators 19a and 19b can be motors.

It is preferable that if both of the two actuators 19a and 19b operate normally, each of the actuators 19a and 19b is controlled to generate 50% of all power that is needed to actuate the inhibitor switch 17, and if one of the actuators 19a and 19b does not operate normally, the other is controlled to generate all the power.

The inhibitor switch position sensors 39a, 39b, and 39c are configured to detect a current position of the inhibitor switch 17 and to generate a signal (inhibitor switch position signal) representing the current position of the inhibitor switch 17.

In a preferred embodiment, to secure more stable operation of the system, three inhibitor switch position sensors 39a, 39b, and 39c are provided. However, the number of inhibitor switch position sensors is not restricted to three.

The second fault-tolerant unit 41 receives the target shift range signal input from the first fault-tolerant unit 29 and the inhibitor switch position signal input from the inhibitor switch position sensors 39a, 39b, and 39c, and it generates a signal (inhibitor switch actuating signal) for driving the actuators 19a and 19b based on the target shift range signal and the inhibitor switch position signal. The actuators 19a and 19b actuate the inhibitor switch 17 to locate at a position corresponding to the shift range represented by the target shift range signal.

The second fault-tolerant unit 41 includes a plurality of fail-silent units 45 and 47 that are respectively connected to each to the inhibitor switch position sensors 39a, 39b and 39c. In this embodiment, two fail-silent units are provided.

As shown in the drawing, a second main fail-silent unit 45 and a second redundant fail-silent unit 47 are respectively connected to each of the inhibitor switch position sensors 39a, 39b, and 39c.

Furthermore, as shown in the drawing, the first main and redundant fail-silent units 31 and 33 and the second main and redundant fail-silent units 45 and 47 are connected to each other through real-time communication buses 49a and 49b to communicate signals. At this time, because these units are connected by dual buses, the system can operate normally even when one of the buses is faulty.

The second main fail-silent unit 45 includes two microcontrollers 51a and 51b and a communication controller 53. Also, the second main fail-silent unit 45 includes an input interface, an output interface, a memory, and related hardware and software, and it is programmed to perform a signal processing method that will be explained hereinafter.

Each of the microcontrollers 51a and 51b is connected to the real-time communication buses 49a and 49b through the communication controller 53, so that the microcontrollers 51a and 51b receives the target shift range signal from the first fault-tolerant unit 29 through real-time communication.

Each of the microcontrollers 51a and 51b is connected to the three inhibitor switch position sensors 39a, 39b, and 39c, so that the microcontrollers 51a and 51b receive the inhibitor switch position signals.

Each of the microcontrollers 51a and 51b generates the inhibitor switch actuating signal based on the inhibitor switch position signals and the target shift range signal.

Each of the microcontrollers 51a and 51b also determines whether the three received inhibitor switch position signals include either two or three of the same signals, and it regards the corresponding signal as a correct signal only if the determination is affirmative. The microcontrollers 51a and 51b then generate the inhibitor actuating signal based on the determined correct inhibitor switch position signal. That is, the microcontrollers 51a and 51b operate in a similar way with the microcontrollers 35a and 35b of the first fault-tolerant unit 29.

After generating the inhibitor switch actuating signal based on the inhibitor position signal and the target shift range signal, each of the microcontrollers 51a and 51b determines whether its inhibitor switch actuating signal is identical with that of the other. If it is determined that the two inhibitor switch actuating signals are identical, the inhibitor switch actuating signal is output to the actuators 19a and 19b. On the other hand, if it is determined that the two inhibitor switch actuating signals are different from each other, the microcontrollers 51a and 51b do not output the inhibitor switch actuating signals to the actuators 19a and 19b (fail-silent).

As stated in the above, the second main fail-silent unit 45 generates its signal in a fail-silent way. The second redundant fail-silent unit 47 has the same inner structure as the second main fail-silent unit 45, and it generates the inhibitor switch actuating signal in the same way.

The second redundant fail-silent unit 47 monitors whether or not the inhibitor switch actuating signal is output from the second main fail-silent unit 45. If it is determined that the inhibitor switch actuating signal is not output from the second main fail-silent unit 45, the second redundant fail-silent unit 47 generates its inhibitor switch actuating signal and outputs the same (fault-tolerant).

That is, if the second main fail-silent unit 45 operates normally, it outputs its inhibitor switch actuating signal. On the other hand, if the second main fail-silent unit 45 does not operate normally, the second redundant fail-silent unit 47 outputs its inhibitor switch actuating signal. Therefore, the second fault-tolerant unit 41 can operate normally even when the second main fail-silent unit 45 is faulty (fault-tolerant).

As stated in the above, the first fault-tolerant unit 29 and the second fault-tolerant unit 41 perform real-time data communication through the real-time communication buses 49*a* and 49*b*. At this time, a communication protocol can preferably be a time triggered protocol such as TTP/C (Time Triggered Protocol class C) and FlexRay.

Furthermore, as shown in the drawing, the first fault-tolerant unit 29 and the second fault-tolerant unit 41 are connected through a CAN bus (Controller Area Network Bus) 55 to an engine control unit (ECU) 57 and a transmission control unit (TCU) 59 to communicate required signals.

Although preferred embodiments of the present invention have been described in detail hereinabove, it should be clearly understood that many variations and/or modifications of the basic inventive concepts herein taught which may appear to those skilled in the present art will still fall within the sprit and scope of the present invention, as defined in the appended claims.

As stated in the above, the shifting system according to the present invention is a shift-by-wire system in which the inhibitor switch is actuated through real-time communication.

Furthermore, the shifting system includes the fault-tolerant units, so the system can operate normally even when the system has some faults.

Furthermore, the fault-tolerant unit is comprised in a fail-silent way, so that the system can cope with failures.

Still furthermore, the shifting system according to the preferred embodiment of the present invention maintains the inhibitor switch, so that the overall structure of the transmission need not be changed.

What is claimed is:

1. A shifting system, comprising:
    a transmission configured to receive a rotational force and to realize a predetermined shifting ratio, the transmission having an inhibitor switch;
    a driver interface module for generating a target shift range signal corresponding to a shift range that is selected by a driver; and
    an inhibitor switch actuating module that is connected through a real-time communication bus to the driver interface module, the inhibitor switch actuating module actuating the inhibitor switch based on a current inhibitor switch position and the target shift range signal input from the driver interface module.

2. The shifting system of claim 1, wherein the inhibitor switch actuating module comprises at least one actuator for actuating the inhibitor switch.

3. The shifting system of claim 2, wherein the actuator is a motor.

4. The shifting system of claim 1, wherein the driver interface module comprises:
    a shift range selection member configured to receive a selected shift range;
    a plurality of shift range sensors for detecting the selected shift range from the shift range selection member and for generating detected shift range signals representing the detected shift range; and
    a first fault-tolerant unit comprising at least one fail-silent unit that is configured to generate the target shift range signal based on the detected shift range signals input from the shift range sensors,
    and wherein the inhibitor switch actuating module comprises:
    a plurality of inhibitor switch position sensors detecting a current position of the inhibitor switch and generating corresponding inhibitor switch position signals;
    a second fault-tolerant unit comprising at least one fail-silent unit that is configured to generate an inhibitor switch actuating signal based on the target shift range signal input from the first fault-tolerant unit and the inhibitor switch position signals input from the inhibitor switch position sensors; and
    at least one actuator actuating the inhibitor switch according to the inhibitor switch actuating signal input from the second fault-tolerant unit.

5. The shifting system of claim 4, wherein the first fault-tolerant unit comprises a first main fail-silent unit and a first redundant fail-silent unit, and the second fault-tolerant unit comprises a second main fail-silent unit and a second redundant fail-silent unit, and wherein the first main fail-silent unit, the first redundant fail-silent unit, the second main fail-silent unit, and the second redundant fail-silent unit are connected with each other through at least one real-time communication bus.

6. The shifting system of claim 5, wherein each of the first main fail-silent unit and the first redundant fail-silent unit comprises:
    a plurality of microcontrollers generating the target shift range signal based on the plurality of detected shift range signals input from the plurality of shift range sensors and outputting the target shift range signal; and
    a communication controller controlling transmission of the target shift range signal from the microcontrollers to the second fault-tolerant unit.

7. The shifting system of claim 6, wherein each of the first main fail-silent unit and the first redundant fail-silent unit is configured to not output its signal if the target shift range signals generated by the plurality of microcontrollers are different from each other.

8. The shifting system of claim 5, wherein each of the second main fail-silent unit and the second redundant fail-silent unit comprises:
    a communication controller controlling signal transmission from the first fault tolerant unit; and
    a plurality of microcontrollers each generating the inhibitor switch actuating signal based on the inhibitor switch position signals input from the plurality of the inhibitor switch position sensors and the target shift range signal input from the first fault-tolerant unit.

9. The shifting system of claim 8, wherein each of the second main fail-silent unit and the second redundant fail-silent unit is configured to not output the inhibitor switch actuating signal if the inhibitor switch actuating signals generated by the plurality of microcontrollers are different from each other.

10. The shifting system of claim 5, wherein the first fault-tolerant unit is configured such that the first redundant fail-silent unit generates the target shift range signal and outputs the target shift range signal if the first main fail-silent unit does not output the target shift range signal.

11. The shifting system of claim 5, wherein the second fault-tolerant unit is configured such that the second redundant fail-silent unit generates the inhibitor switch actuating signal and outputs the inhibitor switch actuating signal if the second main fail-silent unit does not output the inhibitor switch actuating signal.

12. The shifting system of claim 6, wherein said plurality of the shift range sensors is three, and wherein each of the first main fail-silent unit and the first redundant fail-silent unit generates the target shift range signal when a majority of the three signals input from the shift range sensors are the same.

13. The shifting system of claim 8, wherein said plurality of the inhibitor switch position sensors is three, and wherein each of the second main fail-silent unit and the second redundant fail-silent unit generates the inhibitor switch actuating signal when a majority of the three signals input from the inhibitor switch position sensors are the same.

* * * * *